Dec. 15, 1964   J. P. KEMMER   3,161,060
MEANS AND TECHNIQUES FOR MEASURING PRESSURES
Filed Jan. 4, 1960
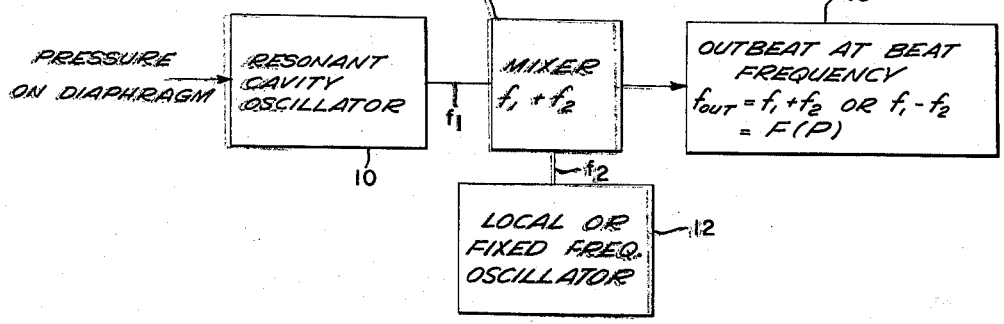
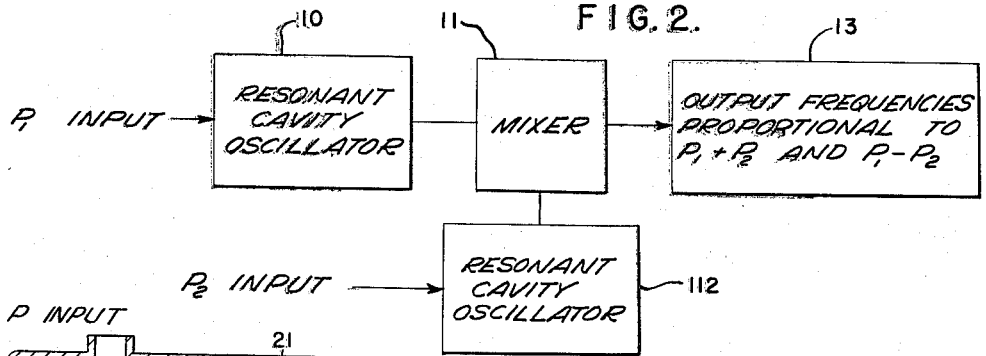
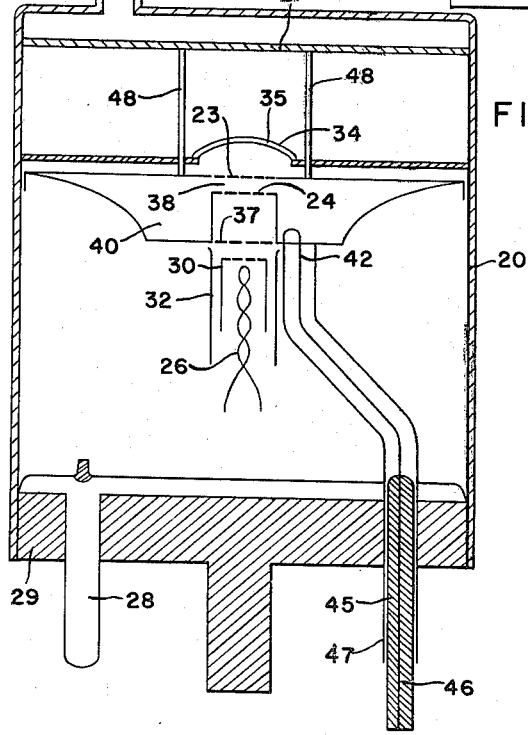
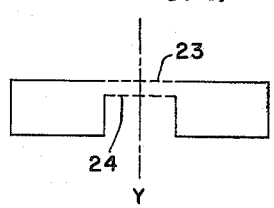
INVENTOR.
JOHN P. KEMMER
BY
ATTORNEYS.

United States Patent Office

3,161,060
Patented Dec. 15, 1964

3,161,060
MEANS AND TECHNIQUES FOR MEASURING PRESSURES
John P. Kemmer, Glendale, Calif., assignor, by mesne assignments, to Litton Industries, Inc., Beverly Hills, Calif., a corporation of Delaware
Filed Jan. 4, 1960, Ser. No. 377
6 Claims. (Cl. 73—398)

The present invention relates to improved means for measuring or indicating both differential and absolute pressures of gaseous or fluid media.

According to an important concept of the present invention, pressure is measured or indicated as a result of the pressure medium changing the resonant frequency of a cavity or enclosure in a high frequency system using a microwave oscillator operating in the frequency spectrum in the range of, for example, 1,000 to 10,000 megacycles. At such frequencies, the frequency of oscillation is determined by the dimensions of a resonant cavity, which in turn, is changed in accordance with the pressure of the media. Thus, one or more sides of the cavity is constructed of thin material to form a diaphragm which, when acted upon by external pressure changes, alters the dimensions of the cavity, thereby changing the frequency of oscillation.

The output frequency of the oscillator may then be measured or compared to a fixed frequency source to obtain a beat frequency signal dependent upon the measured pressure. By proper choice of operating and reference oscillator frequencies, the resultant beat frequency falls in a desired portion of the frequency spectrum, where the frequency is then proportional to pressure and the change in frequency is proportional to the change in pressure.

It is therefore an object of the present invention to provide improved means and techniques whereby the above indicated results may be accomplished.

A specific object of the present invention is to provide a pressure measuring or indicating system using a resonant cavity-type oscillator in which the size of the cavity is determined by pressure and hence the frequency of oscillation is also determined by pressure.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates one form of the system embodying features of the present invention.

FIGURE 2 illustrates a second system also embodying features of the present invention.

FIGURE 3 illustrates constructional features of a klystron type of oscillator embodying features of the present invention which may also be incorporated in the systems illustrated in FIGURES 1 and 2.

FIGURE 4 shows a portion of the structure illustrated in FIGURE 3.

Referring to the drawings and particularly to FIGURE 1, the same includes a resonant cavity-type oscillator 10 supplying energy at frequency $f_1$ to the mixer stage 11. Also supplying energy to the mixer stage 11 is the local or fixed frequency oscillator 12.

The mixer 11 functions in conventional manner to produce an output or beat frequency which is either the sum or difference frequency of frequencies $f_1$ and $f_2$, i.e. the frequencies respectively of oscillators 10 and 12.

In accordance with an important feature of the present invention the oscillator frequency $f_1$ is varied correspondingly in accordance with variations of pressure applied to a diaphragm, the resultant position of the diaphragm determining the size of the cavity and hence the frequency of oscillations, $f_1$.

Preferably the beat frequency $f_1-f_2$ is indicated in the audible range, the indicator for this purpose being indicated generally by the reference numeral 13.

Instead of measuring absolute pressures as in the system shown in FIGURE 1, the system shown in FIGURE 2 may be used to measure differential pressures. The same may be accomplished by applying the reference pressure to one side of the diaphragm and the other pressure to the other side of the diaphragm such that the diaphragm and hence the cavity size is determined by the differential of the two pressures. Alternatively, as shown in FIGURE 2, two resonant cavity oscillators may be used in which one of the pressures is applied to the resonant cavity oscillator 10 as in FIGURE 1 and the second pressure is applied to a second resonant cavity oscillator 112. The energy from these two oscillators 10 and 112 is mixed in the mixer stage 11 to again produce either a sum frequency or a difference frequency which is indicated in conventional indicating means 13.

With respect to the indicator 13, the detection and interpretation of the output frequencies in terms of pressure would, of course, depend upon where the output occurred in the frequency spectrum. In the crudest form, a radio receiver scale calibrated in terms of pressure could be used as the indicator 13. In other forms the indicator 13 may comprise, for example, a vibrating reed-type frequency indicator. In other forms the indicator 13 comprises a frequency-sensitive network used to determine when the output frequency is of a predetermined value and hence the pressure corresponding thereto of a predetermined value.

Various types of resonant cavity tubes may be used in the oscillators shown at 10 and 112 in FIGURES 1 and 2. An oscillator using a reflex klystron shown in FIGURE 3 is now described for this purpose. It is noted that the integral cavity-type of klystron requires the use of an evacuated cavity. Thus, the measurement of absolute pressure as shown in FIGURE 1 may be accomplished with one klystron but measurement of differential pressure requires the use of two klystrons as shown in FIGURE 2.

It is noted that, due to the particular construction of the conventional reflux klystron, the pressure to be measured may be more easily applied to an actuating diaphragm which changes the size of the resonant cavity by means of mechanical linkages, although in some cases the klystron may be of such construction that the size of the resonant cavity may be changed by direct application of pressure to the wall of the resonant cavity.

The cavity of a typical reflex klystron is shown in FIGURE 4 where the cavity is a figure of revolution about the axis Y—Y in FIGURE 4. Although the resonant frequency of the cavity may be changed somewhat by changes in the dimensions of the outer lobes of the cavity, the greatest sensitivity may be obtained by bending the top of the cavity to change the spacing of the beam accelerating grids. Since the grids must be open to permit the passage of the electron beam, and since the beam path must be evacuated, the simplest construction for the reflex klystron type of oscillator involves the use of a separate diaphragm to bend the top of the cavity, thus allowing evacuation of the entire unit as shown in detail in FIGURE 3.

FIGURE 3 illustrates a typical construction of a klystron oscillator tube for use in the systems shown in FIGURES 1 and 2. The tube comprises an evacuated envelope 20 which comprises in part a flexible diaphragm 21 to which the pressure to be measured or indicated is applied for purposes of changing the spacing between the grid elements 23 and 24 and hence the frequency of oscillations.

The tube includes a heater 26 having the leads thereof connected to suitable prongs typified at 28 and extending through the base 29 of the tube. Adjacent to the heater 26 is the cathode 30. A cathode heat shield 32 may surround the cathode. A reflector 34 is mounted on the mica disc 35 above the grid 23.

With respect to the direction of electron movement from the cathode 30, it is noted that there is interposed the following elements in this order, namely control element 37, grids 24 and 23 which define therebetween the variable grid gap 38 and the reflector 34. The resonant cavity 40 is defined in general as the space bounded by the elements 23 and 37 and it is within this cavity that there is positioned the radio frequency pickup loop 42 which has terminals thereof extending through the tube base 29 in the form of a so-called antenna 45. This antenna 45, which includes an inner conductor 46 and an outer conductor 47, comprises the means whereby the energy of frequency $f_1$ is supplied to the mixer stages in FIGURES 1 and 2.

The flexible diaphragm 21 is connected through pushrods 48 to the grid element 23 to change its position and hence the spacing between the elements 23 and 24, i.e. to change the variable grid gap 38.

Thus it will be seen that the diaphragm 21 has its position changed in accordance with pressure to change the grid spacing 38 to thereby change the frequency of oscillations in accordance with the pressure acting on the diaphragm 21.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A system for measuring pressure comprising a resonant cavity electron beam oscillator including an evacuated housing having a deformable diaphragm forming one side thereof, a cavity resonator within said housing for establishing the frequency of oscillation of said oscillator, said frequency being a function of dimensions of said cavity, means for applying gas pressure to said diaphragm, means for mechanically coupling said diaphragm to said cavity to alter the size of said cavity in accordance with the flexing of said diaphragm and thereby alter the frequency of oscillation of said oscillator, and means for measuring the change in frequency of the oscillation in response to said pressure.

2. The system set forth in claim 1, wherein said last named means comprises a fixed frequency oscillator, mixing means for receiving an output signal from said resonant cavity oscillator and said fixed frequency oscillator and producing a beat frequency signal, and means for indicating said beat frequency signal.

3. A system for measuring pressure comprising an electron beam oscillator having a totally enclosed deformable cavity resonator for establishing the frequency of oscillation of said oscillator, a pair of spaced and relatively movable control elements, forming a portion of the walls of said cavity, said frequency of oscillation being a function of the spacing between said elements, an unconstrained flexible diaphragm forming one end of said oscillator, means for mechanically coupling said diaphragm to one of said elements, means for applying air pressure to said diaphragm to bend said diaphragm and change the spacing of said elements, and the size of said cavity, and means for measuring the change in frequency of oscillation of said oscillator produced by said pressure.

4. The system set forth in claim 3, wherein said diaphragm comprises a substantially planar disc forming said one end of said oscillator.

5. A system for measuring pressure comprising a resonant cavity oscillator including a reflex klystron having a deformable evacuated housing, a cavity resonator within said housing for establishing, in accordance with the size of said cavity, the frequency of oscillation of said oscillator, a diaphragm capable of flexing in response to applied air pressure forming one side of said housing, means for mechanically coupling said diaphragm to said cavity for changing the size of said cavity in accordance with the flexing of said diaphragm, and means for measuring the resulting change in frequency of oscillation of said klystron produced by air pressure on said diaphragm.

6. A system for measuring differential pressure comprising first and second resonant cavity oscillators, each including a reflex klystron having a deformable evacuated cavity resonator for establishing the frequency of oscillation of said klystron, a flexible diaphragm forming one side of said klystron oscillator, means for mechanically coupling said diaphragm to said cavity for changing the size of said cavity in accordance with the flexing of said diaphragm, first and second means for applying first and second air pressures to each of said diaphragm of said first and second oscillators, mixing means for receiving an output signal from each of said first and second oscillators and producing a beat frequency signal, the frequency of said beat frequency signal being a function of the differential of said first and second air pressures.

References Cited in the file of this patent

UNITED STATES PATENTS

| | | |
|---|---|---|
| 1,887,739 | Mott-Smith | Nov. 15, 1932 |
| 2,025,461 | Leonard | Dec. 24, 1935 |
| 2,310,783 | Helmbold | Feb. 9, 1943 |
| 2,315,756 | Warner | Apr. 6, 1943 |
| 2,322,681 | Zenor | June 22, 1943 |
| 2,499,626 | Bowman | Mar. 7, 1950 |
| 2,562,943 | Pensyl | Aug. 7, 1951 |
| 2,615,332 | Quinn | Oct. 28, 1952 |

FOREIGN PATENTS

| | | |
|---|---|---|
| 486,619 | Canada | Sept. 16, 1952 |
| 749,790 | Great Britain | May 30, 1956 |

OTHER REFERENCES

Article entitled "Reflex Oscillators for Radar Systems," by J. O. McNally et al., Proceedings of the Institute of Radio Engineers, vol. 35, pp. 1424–1435, December 1947.